(12) United States Patent
Li et al.

(10) Patent No.: US 12,354,304 B2
(45) Date of Patent: Jul. 8, 2025

(54) POSE EMPOWERED RGB-FLOW NET

(71) Applicant: Google LLC, Mountain View, CA (US)

(72) Inventors: Yinxiao Li, Mountain View, CA (US); Zhichao Lu, Mountain View, CA (US); Xuehan Xiong, Mountain View, CA (US); Jonathan Huang, San Carlos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/464,912

(22) Filed: Sep. 11, 2023

(65) Prior Publication Data

US 2023/0419538 A1 Dec. 28, 2023

Related U.S. Application Data

(63) Continuation of application No. 17/303,969, filed on Jun. 11, 2021, now Pat. No. 11,776,156.

(60) Provisional application No. 63/038,193, filed on Jun. 12, 2020.

(51) Int. Cl.
*G06T 7/73* (2017.01)

(52) U.S. Cl.
CPC ...... *G06T 7/73* (2017.01); *G06T 2207/10016* (2013.01); *G06T 2207/20081* (2013.01); *G06T 2207/20084* (2013.01); *G06T 2207/30196* (2013.01)

(58) Field of Classification Search
CPC ............. G06T 7/73; G06T 2207/10016; G06T 2207/20081; G06T 2207/20084; G06T 2207/30196; G06V 10/82; G06V 40/20; G06V 20/41
See application file for complete search history.

(56) References Cited

U.S. PATENT DOCUMENTS 8,988,422 B1 3/2015 Hodgins et al.
10,089,556 B1 * 10/2018 Xu ........................ G06V 10/806
10,826,629 B1 11/2020 Lu et al.
(Continued)

OTHER PUBLICATIONS

Kaihao et al, ("Facial Expression Recognition Based on Deep Evolutional Spatial-Temporal Networks", IEEE Transactions on image processing, vol. 26, No. 9, Sep. 2017) (Year: 2017).
(Continued)

*Primary Examiner* — Amara Abdi
(74) *Attorney, Agent, or Firm* — DORITY & MANNING, P.A.

(57) ABSTRACT

A method includes receiving video data that includes a series of frames of image data. Here, the video data is representative of an actor performing an activity. The method also includes processing the video data to generate a spatial input stream including a series of spatial images representative of spatial features of the actor performing the activity, a temporal input stream representative of motion of the actor performing the activity, and a pose input stream including a series of images representative of a pose of the actor performing the activity. Using at least one neural network, the method also includes processing the temporal input stream, the spatial input stream, and the pose input stream. The method also includes classifying, by the at least one neural network, the activity based on the temporal input stream, the spatial input stream, and the pose input stream.

20 Claims, 8 Drawing Sheets

(56) References Cited

U.S. PATENT DOCUMENTS

| | | | |
|---|---|---|---|
| 10,963,748 B1* | 3/2021 | Tulyakov | G06V 10/764 |
| 11,017,560 B1* | 5/2021 | Gafni | G06N 3/08 |
| 2018/0336465 A1 | 11/2018 | Kim et al. | |
| 2019/0103033 A1 | 4/2019 | Lu Hill et al. | |
| 2019/0139448 A1* | 5/2019 | Marshall | G06F 16/907 |
| 2019/0188533 A1* | 6/2019 | Katabi | G06V 10/82 |
| 2020/0320303 A1* | 10/2020 | He | G06V 10/82 |
| 2020/0349241 A1* | 11/2020 | Shapiro | G06V 10/764 |
| 2021/0195292 A1* | 6/2021 | Gupta | H04N 21/4882 |
| 2021/0279595 A1 | 9/2021 | Sridhar et al. | |
| 2022/0182300 A1* | 6/2022 | Slegers | H04L 43/028 |

OTHER PUBLICATIONS

USPTO. Office Action relating to U.S. Appl. No. 17/303,969 dated Feb. 24, 2023.

* cited by examiner

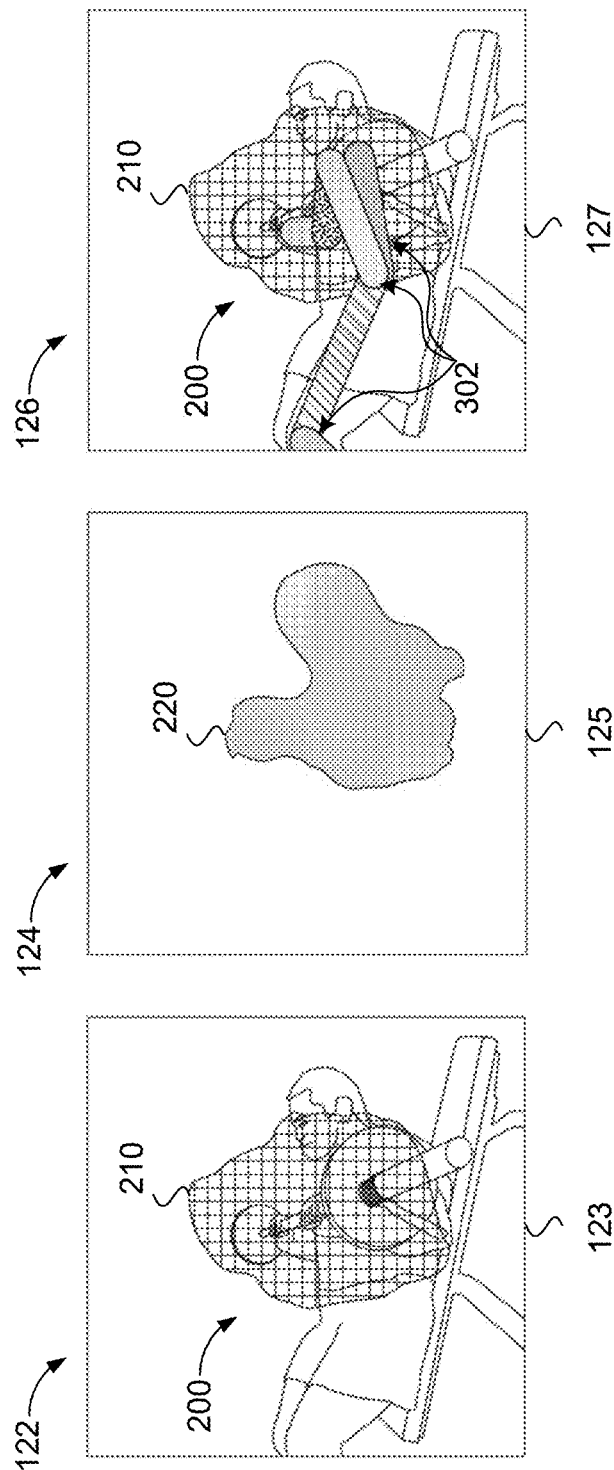

POSE EMPOWERED RGB-FLOW NET

CROSS REFERENCE TO RELATED APPLICATIONS

This U.S. Patent Application is a continuation of, and claims priority under 35 U.S.C. § 120 from, U.S. patent application Ser. No. 17/303,969, filed on Jun. 11, 2021, which claims priority under 35 U.S.C. § 119(e) to U.S. Provisional Application 63/038,193, filed on Jun. 12, 2020. The disclosures of these prior applications are considered part of the disclosure of this application and are hereby incorporated by reference in their entireties.

TECHNICAL FIELD

This disclosure relates to pose empowered RGB-flow net.

BACKGROUND

Video activity recognition has increased in popularity in recent years with the use of machine learning. Specifically, machine learning models are able to perform video activity recognition by identifying an action being performed by one or more actors in a video. In some instances, increasing the number of data representations processed by the machine learning models increases the activity recognition performance. However, increasing the number of data representations also creates an increased latency of activity predictions during execution. Current machine learning models for video activity recognition aim to increase the activity recognition performance while reducing the amount of latency during execution.

SUMMARY

One aspect of the disclosure provides a computer-implemented method that when executed on data processing hardware causes the data processing hardware to perform operations. The operations include receiving video data that includes a series of frames of image data. The video data is representative of an actor performing an activity. The operations also include processing the video data to generate a spatial input stream that includes a series of spatial images representative of spatial features of the actor performing the activity, a temporal input stream representative of motion of the actor performing the activity, and a pose input stream that includes a series of images representative of a pose of the actor performing the activity. Using at least one neural network, the operations also include processing the temporal input stream, the spatial input stream, and the pose input stream. The operations also include classifying, by the at least one neural network, the activity based on the temporal input stream, the spatial input stream, and the pose input stream.

Implementations of the disclosure may include one or more of the following optional features. In some implementations, the at least one neural network includes a three dimensional convolutional neural network (3D CNN). The at least one neural network may include a first neural network that processes the spatial input stream, a second neural network that processes the temporal input stream, and a third neural network that processes the pose input stream. In some examples, the operations further include: summing an output of the first neural network, the second neural network, and the third neural network; and processing, using a softmax layer, the summed outputs of the first neural network, the second neural network, and the third neural network. In these examples, the output of the first neural network, the output of the second neural network, and the output of the third neural network may include logits.

In some implementations, the at least one neural network includes a student neural network that processes the spatial input stream and at least one teacher neural network that processes the temporal input stream and the pose input stream. In these implementations, the operations may further include training the student neural network using the at least one teacher neural network. Optionally, the at least one neural network may classify the activity using only the trained student neural network. The at least one teacher neural network may include a plurality of teacher neural networks that share a unified loss. Alternatively, the at least one teacher neural network may include a plurality of teacher neural networks that each include separate losses.

In some examples, the pose input stream includes a series of pose images where each pose image in the series of pose images is annotated with a pose of the actor. In these examples, the annotated pose of each pose image in the series of colored images includes lines denoting limbs of the actor. Each limb may be a different color. Optionally, each line includes a thickness proportional to a size of a bounding box associated with the actor.

Another aspect of the disclosure provides a system that includes data processing hardware and memory hardware storing instructions that when executed on the data processing hardware cause the data processing hardware to perform operations. The operations include, receiving video data that includes a series of frames of image data. The video data is representative of an actor performing an activity. The operations also include processing the video data to generate a spatial input stream that includes a series of spatial images representative of spatial features of the actor performing the activity, a temporal input stream representative of motion of the actor performing the activity, and a pose input stream that includes a series of images representative of a pose of the actor performing the activity. Using at least one neural network, the operations also include processing the temporal input stream, the spatial input stream, and the pose input stream. The operations also include classifying, by the at least one neural network, the activity based on the temporal input stream, the spatial input stream, and the pose input stream.

Implementations of the disclosure may include one or more of the following optional features. In some implementations, the at least one neural network includes a three dimensional convolutional neural network (3D CNN). The at least one neural network may include a first neural network that processes the spatial input stream, a second neural network that processes the temporal input stream, and a third neural network that processes the pose input stream. In some examples, the operations further include: summing an output of the first neural network, the second neural network, and the third neural network; and processing, using a softmax layer, the summed outputs of the first neural network, the second neural network, and the third neural network. In these examples, the output of the first neural network, the output of the second neural network, and the output of the third neural network may include logits.

In some implementations, the at least one neural network includes a student neural network that processes the spatial input stream and at least one teacher neural network that processes the temporal input stream and the pose input stream. In these implementations, the operations may further include training the student neural network using the at least one teacher neural network. Optionally, the at least one neural network may classify the activity using only the trained student neural network. The at least one teacher neural network may include a plurality of teacher neural networks that share a unified loss. Alternatively, the at least one teacher neural network may include a plurality of teacher neural networks that each include separate losses.

In some examples, the pose input stream includes a series of pose images where each pose image in the series of pose images is annotated with a pose of the actor. In these examples, the annotated pose of each pose image in the second series of pose images includes lines denoting limbs of the actor. Each limb may be a different color. Optionally, each line includes a thickness proportional to a size of a bounding box associated with the actor.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2A-2C are schematic views of an example spatial input stream, temporal input stream, and pose input stream.

Like reference symbols in the various drawings indicate like elements.

DETAILED DESCRIPTION

Video activity recognition models classify, using video input, actions or activities performed by one or more actors. In many instances, these video activity recognition models rely on two data representations as inputs: spatial and temporal data representations. The spatial data representation includes spatial features of the one or more actors performing the activity and the temporal data representation includes motion of the one or more actors performing the activity. The video activity recognition models process the spatial and temporal data representations to classify the action performed by the one or more actors. However, an additional data representation for the video data may include a pose of the actor performing the activity. Pose represents the one or more joint locations of the actor performing the activity. The additional pose data representation provides beneficial information that is complementary to the spatial and temporal data representations for determining the activity performed. For example, determining the location of the legs of a person (i.e., pose) is useful when differentiating if a person is running, jogging, or walking. That is, a large distance between the legs of the person may be indicative that the person is running and a short distance between the legs of the person may be indicative that the person is walking.

Implementations herein are directed toward a method of video activity recognition based on spatial, temporal, and a pose input streams using a Pose Empowered RGB-Flow Net (PERF-Net) model (also referred to herein as a video activity recognition model). Specifically, a data generator processes video data and generates data representations including spatial, temporal, and pose input streams. A neural network system processes each of the input streams, using one or more neural networks, and classifies the action performed by an actor in the video. Here, the neural network system may include separate neural networks that process each of the input streams independently. Each neural network of the neural network system predicts an output that classifies the activity performed using one of the input streams. Subsequently, the neural network system fuses each of the outputs from the neural networks via ensembling to generate a final output that classifies the activity performed. Optionally, the neural network system may only process the spatial input stream to classify the action performed by the actor.

Figure 1:
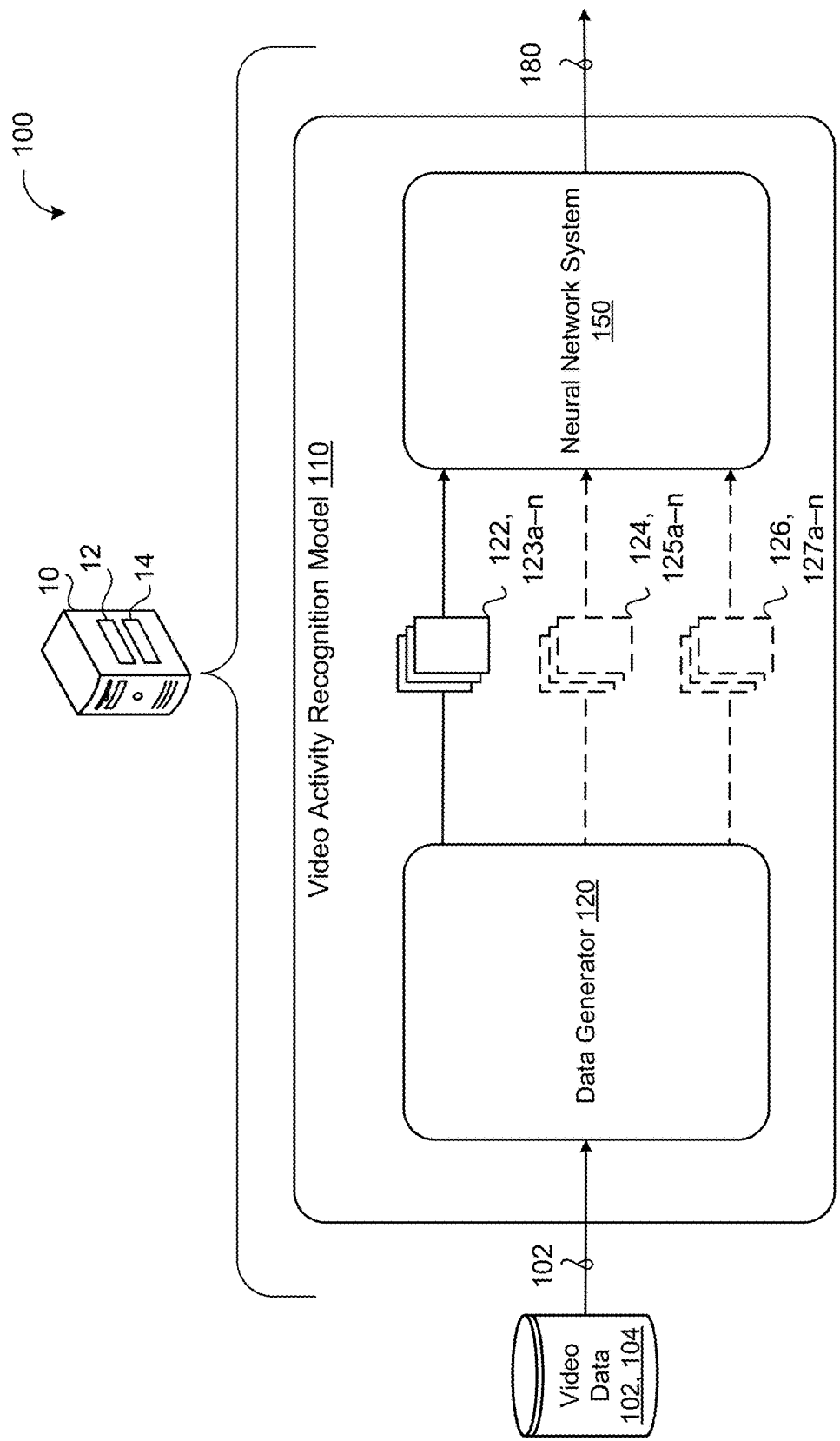
FIG. 1 is a schematic view of an example system for performing video activity recognition.

Referring now to FIG. 1, in some implementations, an example system 100 includes a processing system 10. The processing system 10 may be a single computer, multiple computers, a user device, or a distributed system (e.g., a cloud computing environment) having fixed or scalable/elastic computing resources 12 (e.g., data processing hardware) and/or storage resources 14 (e.g., memory hardware). The processing system 10 executes a video activity recognition model 110. The video activity recognition model 110 is configured to determine an action performed by an actor (e.g., a person, an animal, a robot, etc.) using received video data 102. The video data 102 is representative of an actor 200 (FIG. 2) performing any activity and may be stored in the processing system 10 (e.g., within the memory hardware 14) or received, via a network or other communication channel, from another entity (e.g., another processing system 10). In some examples, the video activity recognition model 110 receives a request from a user via the network to classify an action in a corresponding video included in the request or stored on the processing system 10.

The video data 102 may represent a single actor 200 performing an activity such as a push-up, a sit-up, climbing a ladder, opening a box, etc. As additional examples, the video data 102 may represent one or more actors 200 performing an activity including arm-wrestling, fencing, playing polo, pillow fighting, etc. That is, the video data 102 includes one or more actors 200 performing any activity that may be defined at least partially by motion or pose. The video data 102 includes a series of frames of image data representing the video data 102. That is, the video data 102 may be represented by a series of images rather than continuous video data. Accordingly, the video activity recognition model 110 may process one or more images from the series of images at each processing step instead of processing the entirety of the video data 102. The video data 102 may also include a corresponding video data label 104 that denotes the activity being performed in the video data 102. For example, video data 102 of a person folding napkins has a corresponding video data label 104 of "folding napkins." In some examples, each individual frame of the video data 102 includes a label 104. Taken together, the video data 102 and labels 104 comprise labeled training samples for the video activity recognition model 110.

Video data 102 may be represented by several different data representations that each communicate different information about the video data 102. In particular, the video data 102 may include a spatial input stream 122, a temporal input stream 124, and a pose input stream 126. As shown in FIG. 1, a data generator 120 processes the video data 102 to generate the spatial input stream 122, the temporal input stream 124, and the pose input stream 126. Subsequently, a neural network system 150 processes the spatial input stream 122, the temporal input stream 124, and the pose input stream 126 to classify the action performed in the video data 102. The neural network system 150 may include one or more three dimensional convolutional neural networks (3D CNNs). In some implementations, the video activity recognition model 110 does not process the temporal input stream 124 or the pose input stream 126 and instead only processes the spatial input stream 122 to classify the action. The video activity recognition model 110 generates, as output from the neural network system 150, a final output 180 that classifies the activity performed by the actor 200 in the video data 102 (i.e., in multiple images of the video data 102).

The spatial input stream 122 includes a series of spatial images 123, 123a—n (e.g., colored images such as red-green-blue (RGB) images). Each spatial image 123 in the first series of spatial images 123 is representative of spatial features of the one or more people performing the activity. Specifically, the spatial features of the spatial input stream 122 provide information about the actor's location in relation to their surrounding environment. That is, the spatial features of the actor 200 performing the activity may include depth, size, and location of the actor 200 relative to the surrounding environment.

The temporal input stream 124 may be representative of motion of the actor 200 performing the activity in the video data 102. For example, the motion may include an arm moving, a leg raising, a head rotating, or any other motion of the actor 200 when performing the activity. In some implementations, the temporal input stream 124 includes a sequence of motion images 125, 125a—n (e.g., motion frames or optical flow frames) representing the actor 200 performing the activity. Here, each motion image 125 in the sequence of motion images 125 represents a portion of the actor's movement while performing the activity. In some examples, the motion of the actor 200 performing an activity is derived from one or more frames of image data from the video data 102. Accordingly, each motion image 125 in the sequence of motion images 125 of the temporal input stream 124 represents the motion of the actor 200 for at least a portion of the total video data 102.

A pose of an actor 200 is intuitively linked to the activity performed by the actor 200. For example, determining the location of the legs and the arms of an actor 200 helps to enable the video activity recognition model 110 to differentiate actions such as jumping, walking, or sitting. The pose input stream 126 includes a series of pose images 127, 127a—n that each represent a pose of the actor 200 performing the activity captured by the video data 102. Here, pose refers to joint positions and/or limb positions on a body of the actor 200 performing the activity at each pose image 127 of the series of pose images 127. Joint positions and/or limb positions may include leg position, arm position, forearm position, upper arm position, upper leg position, lower leg position, or any other joint position of the actor 200.

In some examples, the pose of the actor 200 includes contextual cues that provide important information about whether the actor 200 is interacting with any external objects. For example, information that the actor 200 is holding a golf club may be pertinent information for the video activity recognition model 110 to determine the actor 200 is golfing. The contextual cues may be readily apparent from each pose image 127 that represents the pose of the actor 200 because external objects are in addition to any limb of the actor 200. For example, the pose input stream 126 may illustrate that a baseball bat that an actor 200 is holding is an external object rather than a limb of the actor 200. The contextual cue (e.g., an actor 200 holding a baseball bat) provides further information about the activity performed by the actor 200.

FIGS. 2A-2C include an example of a spatial image 123 from the spatial input stream 122 (FIG. 2A), a motion image 125 from the motion temporal input stream 124 (FIG. 2B), and a pose image 127 from the pose input stream 126 (FIG. 2C) for video data 102 of a person performing a barbell sit-up. The spatial image 123 represents a single image from the spatial input stream 122. Here, the spatial image 123 includes spatial features 210 of an actor 200 (i.e., a person) performing the barbell sit-up for a single image frame from the video data 102. The spatial features 210 of the spatial image 123 include depth, size, and orientation of the person performing the barbell sit-up. The spatial features 210 of the spatial image 123 may be represented by RGB pixels in the spatial image 123. Specifically, the color and/or intensity of each RGB pixel may provide information on the spatial features 210 of the spatial image 123.

The motion image 125 exemplified in FIG. 2B represents the motion of the actor 200 performing the activity for the temporal input stream 124. The motion image 125 includes a representation of the motion 220 of the person moving from the laying down position to the sitting-up position while performing the barbell sit-up. The motion temporal input stream 124 captures the motion performed by the actor 200 over a series of images (i.e., frames) of the video data 102. Capturing the motion over the series of images allows the single motion image 125 to capture a period of time (e.g., multiple image) of the video data 102 when the actor 200 performs the activity. In some implementations, the motion image 125 for the temporal input stream 124 represents the entirety of the frames of image data that make up the video data (e.g., the entire video of the person performing multiple sit-ups). In other implementations, the motion image 125 of the temporal input stream 124 represents only a portion of the video data (e.g., only one sit-up from the multiple sit-ups in the video data 102).

The pose image 127 exemplified in FIG. 2C represents a pose image 127 from the series of pose images 127 that represents the pose of the actor 200. Here, the pose image 127 is annotated with a plurality of lines 302 representing joint locations of the person (e.g., the pose of the person) performing the barbell sit-up. In some examples, each line 302 is a different color or pattern to easily differentiate between the different lines 302. For example, here each line 302 is represented by a different shading, hatching, or pattern. Each joint location or portions of the actor 200 connecting different joint locations (e.g., the portion of the actor 200 from the hip to the knee, the portion of the actor 200 from the shoulder to the elbow, etc.) may include a different colored or patterned line 302 to differentiate from the other joint locations or portions, discussed in more detail below. The annotated pose image 127 from the series of pose images 127 represents the pose of the person for a single image from the video data 102. In some examples, the pose image 127 is an annotated (e.g., with lines 302) copy of a corresponding spatial image 123. Here, the pose image 127 of FIG. 2C is equivalent to the spatial image 123 of FIG. 2A annotated with the lines 302. The annotated pose image 127 may provide contextual cues to the spatial image 123. In this example, the actor 200 is laying on a bench and holding a barbell. However, the pose image 127 does not include annotations (i.e., lines 302) for the bench and the barbell and therefore it is readily apparent that these are external objects and not a portion of the actor 200.

Figure 3A:
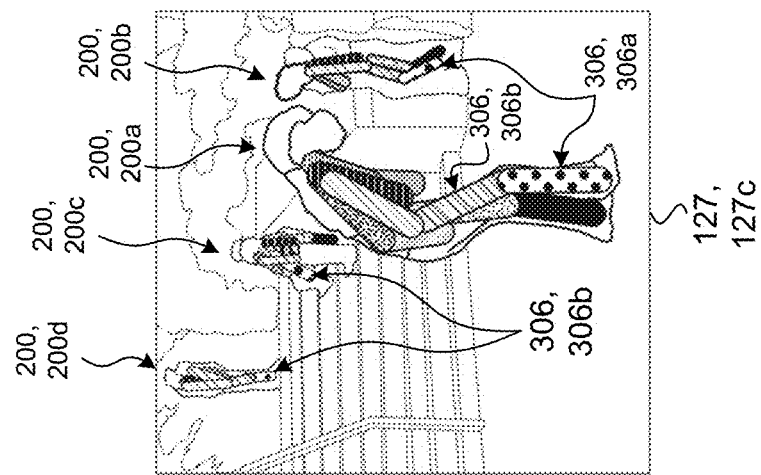
FIGS. 3A-3C are schematic views of exemplary annotated images for the pose input stream.
Figure 3B:
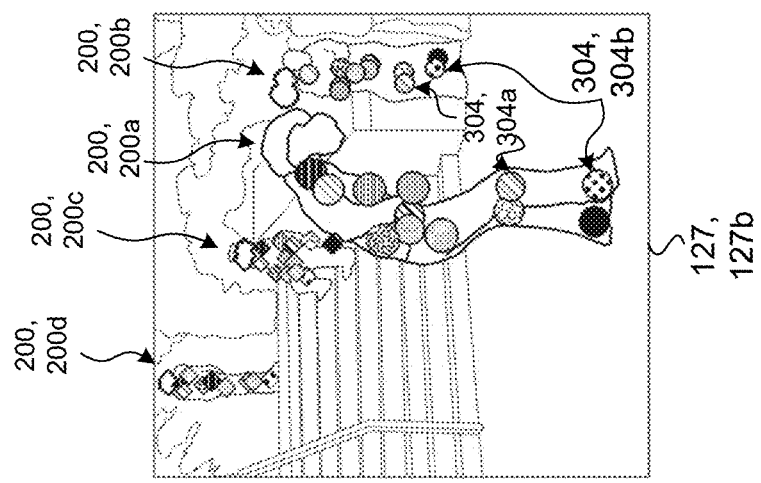
Figure 3C:
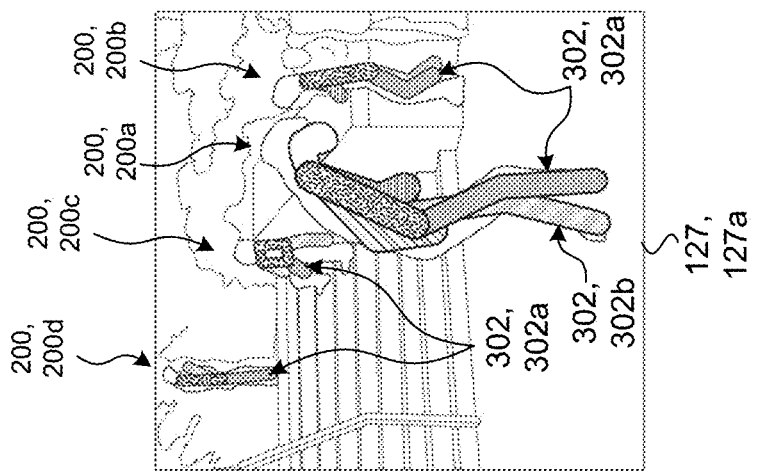

FIGS. 3A-3C include three different respective annotations of the same pose image 127, 127a—c from a series of pose images 127 that includes a person dancing. The video activity recognition model 110 may use these annotations to determine or classify or categorize the activity of one or more actors 200 present in the pose image 127. The first annotated pose image 127a (FIG. 3A) includes a plurality of lines 302 annotating portions that connect joint locations of the actor 200, 200a performing an activity (i.e., dancing). In some implementations, each joint location may be represented by a different line 302 (e.g., different color, shading, hatching, pattern, etc.) to differentiate the different joint locations or portions connected by joint locations. Here, the first annotated pose image 127a includes a line 302, 302a with a first pattern for the right leg of the dancer. In some examples, the same portions of all actors 200 within the image are represented in the same way. Here, the right leg of each of the actors 200, 200b—d in the background of the pose image 127a have the same pattern as the right leg of the dancer 200a. Similarly, the left leg of the dancer 200a and the left leg of one of the actors 200b in the background are both annotated with a line 302, 302b with the same pattern. That is, the data generator 120 may annotate any number of actors 200 within the scene of the pose image 127.

The second annotated image 127b (FIG. 3B) includes a plurality of dots 304 or circles to annotate each joint location of the actors 200. There may be a plurality of dots 304 to represent each of the different joint locations. The dots 304 may include different colors, textures, patterns, shading, etc. to differentiate between each of the different detected joint locations. Here, the right knee of the dancer is annotated with a dot 304, 304a with a slashed line shading and the right ankle of the dancer is annotated with a dot 304, 304b with polka dots. Other detected actors within the pose image 127a may be annotated with similar dots 304. Here, another actor 200b includes the same dot 304 at the right knee and at the right ankle as the dancer 200a. Likewise, two other actors 200c, 200d in the background include matching squares (instead of circles).

The third annotated image 127c (FIG. 3C) illustrates additional examples of rendering effects. Here, the lines 302 of FIG. 3A are broken up into additional segments 306. For example, the leg of the actor 200a is broken up into two different segments 306 with different patterns. The segments may represent portions of the limbs of the actors such as upper arm and forearm, upper leg and lower leg, etc. As shown in the third annotated image 127c, the lower left leg is annotated with a first line segment 306, 306a and the upper left leg is annotated with a second line segment 306, 306b.

In some implementations, the annotations (e.g., the lines/segments 302, 306 and/or the dots 304 include ratio-aware thicknesses. In particular, ratio-aware thicknesses provide the annotations (i.e., each line 302 and dot 304) a thickness that is proportional to a size of a bounding box associated with the corresponding actor 200. That is, the larger the bounding box of the actor 200, the thicker the annotation and the smaller the bounding box of the actor 200, the thinner the annotation. For example, people that are larger in size or closer in depth of the image have larger bounding boxes and therefore thicker lines 302 and/or dots 304. Here, the dancer 200a is closer in depth and thus has thicker lines 302 and dots 304 than the bystanders 200b—d that are further away from the camera.

Figure 4:
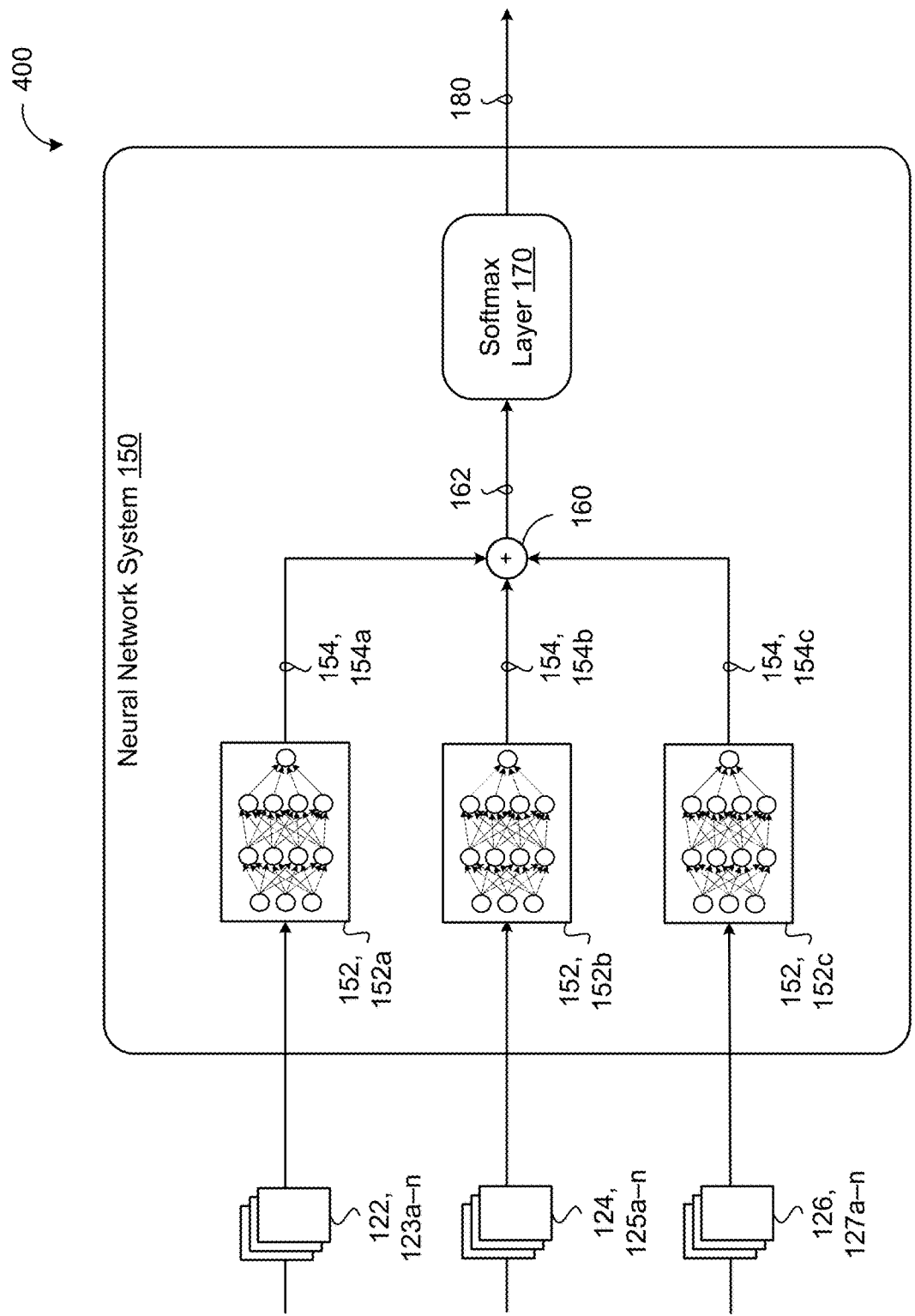
FIG. 4 is a schematic view of exemplary components of the system of FIG. 1 using a spatial input stream, a temporal input stream, and a pose input stream to perform video activity recognition.

Referring now to FIG. 4, a schematic view 400 illustrates the neural network system 150 classifying the activity of the video data 102 using the spatial input stream 122, the temporal input stream 124, and the pose input stream 126. The neural network system 150 may include a separate neural network 152 to process each input stream. In some implementations, each of the neural networks 152 include a three dimensional convolutional neural network (3D CNN). In the example shown, the neural network system 150 includes a first neural network 152, 152a that processes the spatial input stream 122, a second neural network 152, 152b that processes the temporal input stream 124, and a third neural network 152, 152c that processes the pose input stream 126. Here, each neural network 152 of the neural network system 150 is independent of the other neural networks 152 in the neural network system 150 and generates an output 154 (i.e., a prediction 154). That is, the first neural network 152a is trained specifically to classify the video action using the spatial input stream 122, the second neural network 152b is trained specifically to classify the action using the temporal input stream 124, and the third neural network 152c is trained specifically to classify the action using the pose input stream 126.

In some implementations, the first neural network 152a generates a first output 154, 154a representing a prediction of the activity performed in the video data 102 using the spatial input stream 122. The second neural network 152b generates a second output 154, 154b representing a prediction of the activity performed in the video data 102 using the temporal input stream 124. The second output 154b may predict the same activity or a different activity from the first output 154a. The third neural network 152c generates a third output 154, 154c representing a prediction of the activity performed in the video data 102 using the pose input stream 126. Here, the third output 154c may predict that same activity and/or a different activity from the first output 154a and the second output 21b. Each of the outputs 154a, 154b, and 154c may include logits that represent a probability of the activity performed in the video data 102. For example, an output 154 can include a logit representing a 0.6 probability that the activity is walking and a 0.4 probability that the activity is running.

The neural network system 150 may perform late fusion using the logits from each of the outputs 154 using a forward pass for each input stream. In particular, a summing operator 160 may fuse the outputs 154 via ensembling by summing the first output 154a, the second output 154b, and the third output 154c to generate a summation 162. The summation 162 represents a sum of the activity prediction probability distributions (e.g., logit) from each output 154. Subsequently, the neural network system 150 may apply a softmax normalization to the summation 162, using a softmax layer 170, to project or predict a final output 180. The video activity recognition model 110 may use any method to classify the final activity prediction from the final output 180. That is, the video activity recognition model 110 may classify activity in the final output 180 by selecting the highest probability and/or may select any number of activities that satisfy a threshold probability. After generating the final output 180, the video activity recognition model 110 may provide the final output 180 to the user via the network in response to the user request.

Distillation training may reduce the computational cost of executing the video activity recognition model 110 by transferring knowledge of a complex teacher neural network to a smaller student neural network by optimizing the student network to model the behavior of the one or more teacher neural networks. During training, the student neural network may receive only a single input stream (i.e., the spatial input stream 122, the temporal input stream 124, or the pose input stream 126) to predict the activity of the actor(s) within the video data 102. The plurality of teacher neural networks receive the other input streams (i.e., the input streams not used by the student neural network) during training to predict the activity. Distillation training uses the losses from the plurality of teacher neural networks and the student neural network to train the student neural networks. Accordingly, the student neural networks benefit from the multiple input streams of the teacher neural networks during training, but only processes a single input stream during inference.

Figure 5A:
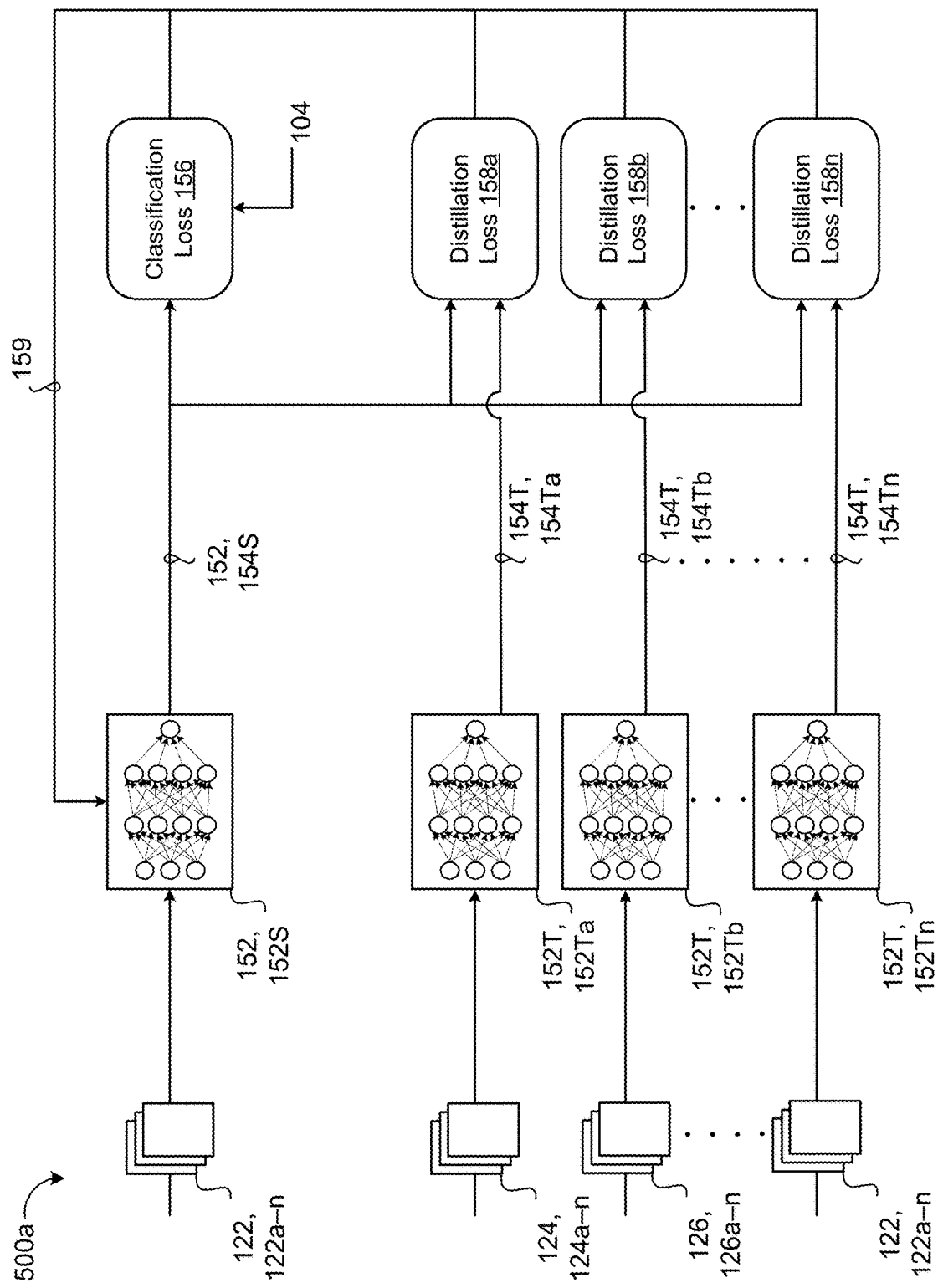
FIG. 5A is a schematic view of training a student neural network using a plurality of teacher neural networks.

Referring now to FIG. 5A, a schematic view 500a illustrates multiple teacher neural networks 152, 152Ta-n training a student neural network 152, 152S by distillation training. In some examples, the teacher neural network 152T includes only a single teacher neural network 152T. The plurality of teacher neural networks 152T may include any number of teacher neural networks 152T. In the example shown, the neural network system 150 includes a single student neural network 152S configured to receive the spatial input stream 122 and generate a student output 154, 154S representing a prediction of the activity performed by the actor 200 in the video data 102. The student output 154S may include a logit representing a probability distribution of the activity performed in the video data 102. Using the student output 154S and the video data label 104 for the respective video data 102, the neural network system 150 determines a classification loss 156. The classification loss 156 represents a difference between the student output 154S and the video data label 104 (e.g., ground truth label). For example, the worse the prediction 154S (i.e., the farther the prediction 154S is off from the label 104), the greater the classification loss 156.

The student neural network 152S only receives the spatial input stream 122 as input and therefore may not consider the temporal input stream 142 or pose input stream 126 to generate the student output 154S. In this scenario, the neural network system 150 also includes the plurality of teacher neural networks 152T that generate teacher outputs 154, 154T. In some implementations, the plurality of teacher neural networks 152T generate a plurality of teacher outputs 154T, 154Ta-n. For each teacher neural network 152T in the plurality of teacher neural networks 152T the neural network system 150 determines a distillation loss 158 representing a cross-entropy loss between the student output 154S and the respective teacher output 152T. The neural network system 150 may include any number of distillation losses 158, 158a—n.

The plurality of teacher neural networks 152T may receive any data representation of the video data 102 (e.g., the spatial input stream 122, the temporal input stream 124, the pose input stream 126, etc.) to predict the teacher output 154T. Optionally, each teacher neural network 152T may process a single input (e.g., the spatial input stream 122, the temporal input stream 124, and the pose input stream 126) or multiple inputs. In the example shown, a first teacher neural network 152T, 152Ta receives the temporal input stream 124 and determines a first teacher output 154Ta that predicts the activity based on the temporal input stream 124. In some examples, the first teacher neural network 152T is trained specifically to predict the activity using the temporal input stream 124. Using the first teacher output 154Ta and student output 154S, the neural network system 150 determines a first distillation loss 158a. Here, the first distillation loss 158a represents the cross-entropy loss between the logit of the student output 154S and the logit of the first teacher output 154Ta. That is, the first distillation loss represents the difference in the predicted activity probability distribution of the student output 154S and the first teacher output 154Ta.

Continuing with the same example, the neural network system 150 includes a second teacher neural network 152T, 152Tb that receives the pose input stream 126 and determines a second teacher output 154Tb that predicts the activity based on the pose input stream 126. The neural network system 150 determines a second distillation loss 158b using the second teacher output 154Tb and the student output 154S. Here, the second distillation loss 158b represents the cross-entropy loss between the logit of the student output 154S and the logit of the second teacher output 154Tb. In the example shown, only two teacher neural networks 152T are considered for the sake of clarity, however, implementations herein may include any number of teacher neural networks 152T. In some implementations, the plurality of teacher neural networks 152T may also include a teacher neural network 152T to process one or more spatial input streams 122, temporal input streams 124, pose input streams 126, and/or any combination thereof. For each of the teacher neural networks 152T the neural network system 150 determines a respective distillation loss 158.

In some implementations, the neural network system 150 uses the classification loss 156 and the distillation losses 158 to train the student neural networks 152S. That is, the distillation losses and the classification loss 156 are combined to create a total loss 159 that is provided as feedback to train the student neural network 152S. The total loss 159 (L) may be represented by:

$$L = L^c(S^\ell) + \sum_i^N MSE(T_i^\ell, S^\ell) \qquad (1)$$

In Equation (1), L denotes the total loss 159, $L^c$ denotes a cross-entropy loss between one or more output logits, $S^\ell$ denotes logits from the student neural network 152S, and $T_i^\ell$ denotes logits from the ith teacher neural network 152T of N number of teacher neural networks 152T. It is noteworthy that as shown in Equation 1 and FIGS. 3A-3C, the total loss 159 includes the distillation losses 158 for each of the plurality of teacher networks 152T independently. In alternative examples, the teacher neural networks 152T of the neural network system 150 share a unified regression loss (not shown) by summing each of the distillation losses 158 of the plurality of teacher networks 158T. In these examples, the neural network system 150 uses the unified regression loss and the classification loss 156 to compute the total loss 159 and train the student neural network 152S.

The total loss 159 is provided to the student neural network 152S as feedback during training with the goal of minimizing the total loss 159 (i.e., minimize the number of errors in predicting the activity in the video data 102). Using the total loss 159 for training allows the student neural network to benefit from multiple input streams without the student neural network actually processing each input stream. That is, even though the student neural network 152S only uses the spatial input stream 122 to determine the student output 154S, the neural network system 150 determines the distillation losses 158 using multiple input streams 122, 124, 126. Accordingly, because the total loss 159 includes the classification loss 156 and the distillation losses 158, the student neural network 152S benefits from the multiple input streams during training.

The neural network system 150 may remove all max pooling operations for the temporal input stream 124. Applying any temporal downsampling to the temporal input stream 124 may degrade performance of the neural network 152 predicting the activity based on the temporal input stream 124. In some implementations, the neural network system 150 includes a feature gating module (not shown) after each residual block. The feature gating module is a self-attention mechanism that re-weights the channels based on context (i.e., the feature map averaged over time and space). Optionally, the neural network system includes the feature gating module after each residual cell.

Figure 5B:
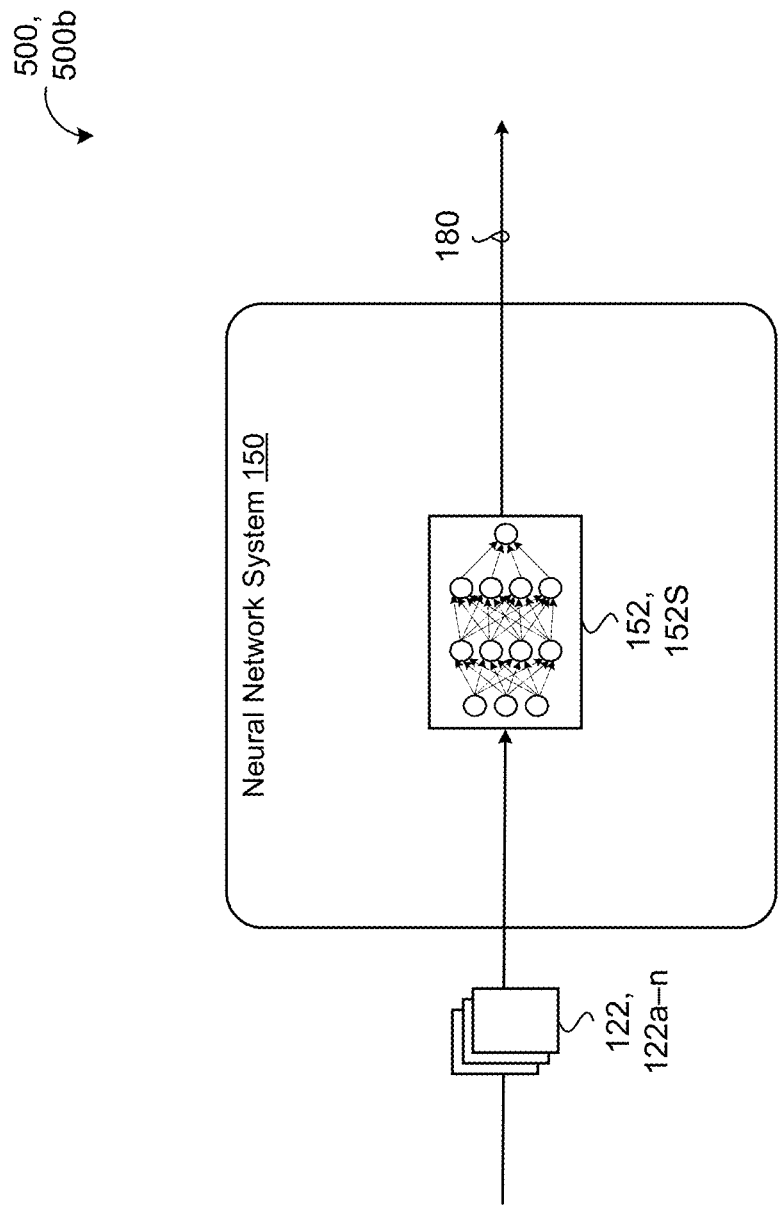
FIG. 5B is a schematic view of executing the neural network system using the trained student neural network from FIG. 5A to perform video activity recognition.

Referring now to FIG. 5B, a schematic view 500b illustrates executing the neural network system 150 using the trained student neural network 152S from FIG. 5A to perform video activity recognition. Here, during inference, the neural network system 150 executes only the single student neural network 152S that receives the spatial input stream 122 to generate the final output 180. In particular, only the spatial input stream 122 is processed during inference. The student neural network 152S does not sacrifice video activity recognition performance because during training the student neural network 152S trains to mimic the outputs of the plurality of teacher neural networks 152T. Accordingly, the neural network system 150 maintains the video activity recognition performance of processing the spatial input stream 122, temporal input stream 124, and pose input stream 126 (FIGS. 2A-2C) while minimizing the computational cost by only processing the spatial input stream 122 during inference.

Figure 6:
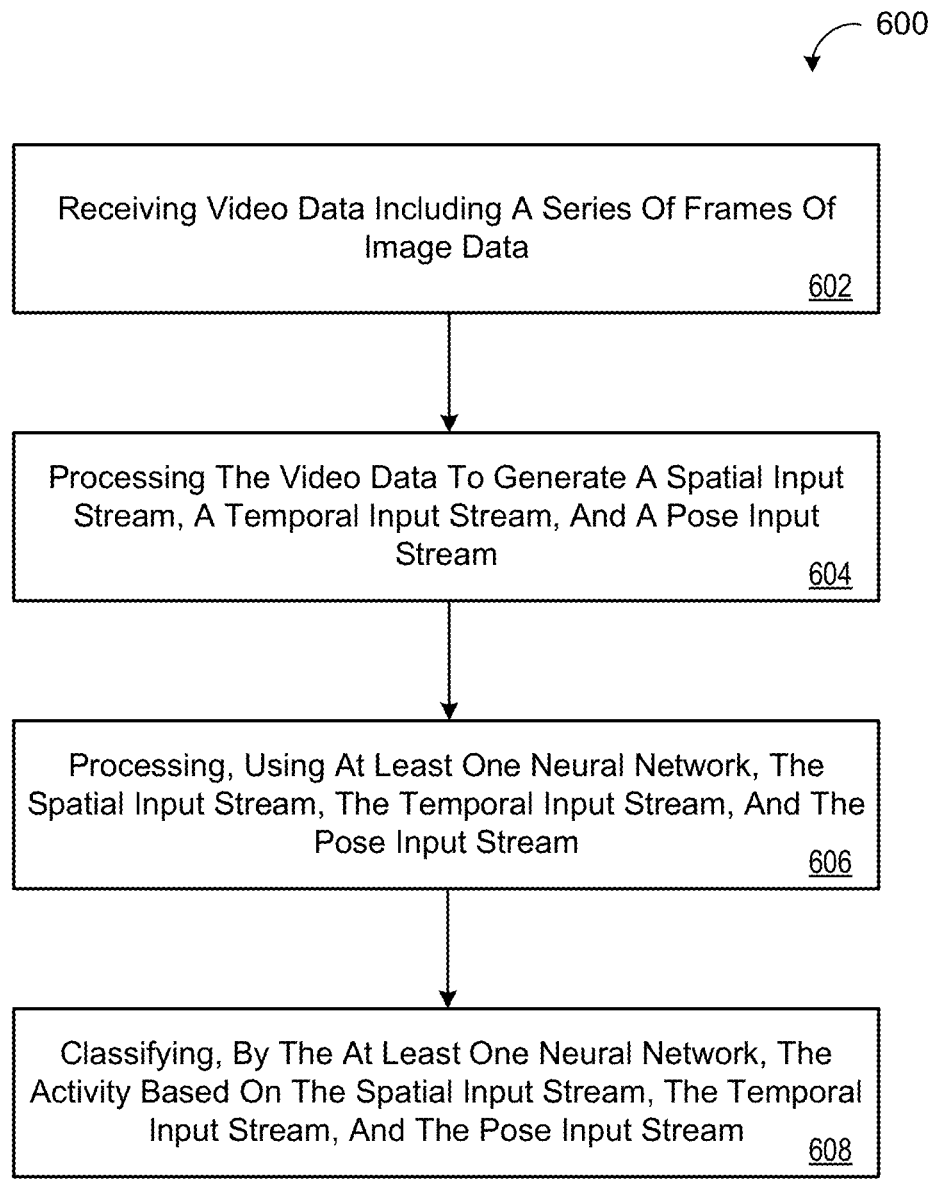
FIG. 6 is flowchart of an example arrangement of operations for a computer-implemented method of executing a video activity recognition model.

FIG. 6 is a flowchart of an exemplary arrangement of operations for a computer-implemented method 600 of executing a video activity recognition model. At operation 602, the method 600 includes receiving video data 102 that includes a series of frames of image data. The video data 102 is representative of an actor performing an activity. At operation 604, the method 600 includes processing the video data 102 to generate a spatial input stream 122, a temporal input stream 124, and a pose input stream 126. Here, the spatial input stream 122 includes a series of spatial images 123, 123a—n where each spatial image 123 in the series of spatial images 123 is representative of spatial features of the actor performing the activity. The temporal input stream 124 is representative of motion of the actor performing the activity. The temporal input stream 124 includes a sequence of motion images 125 representing a portion of the motion of the actor in the video data 102. The pose input stream 126 includes a series of pose images 127 where each pose image 127 in the series of pose images 127 is representative of a pose of the actor performing the activity. At operation 606, the method 600 includes processing, using at least one neural network 152, the spatial input stream 122, the temporal input stream 124, and the pose input stream 126. The method 600, at operation 608, includes classifying, by the at least one neural network 152, the activity based on the spatial input stream 122, the temporal input stream 124, and the pose input stream 126.

Figure 7:
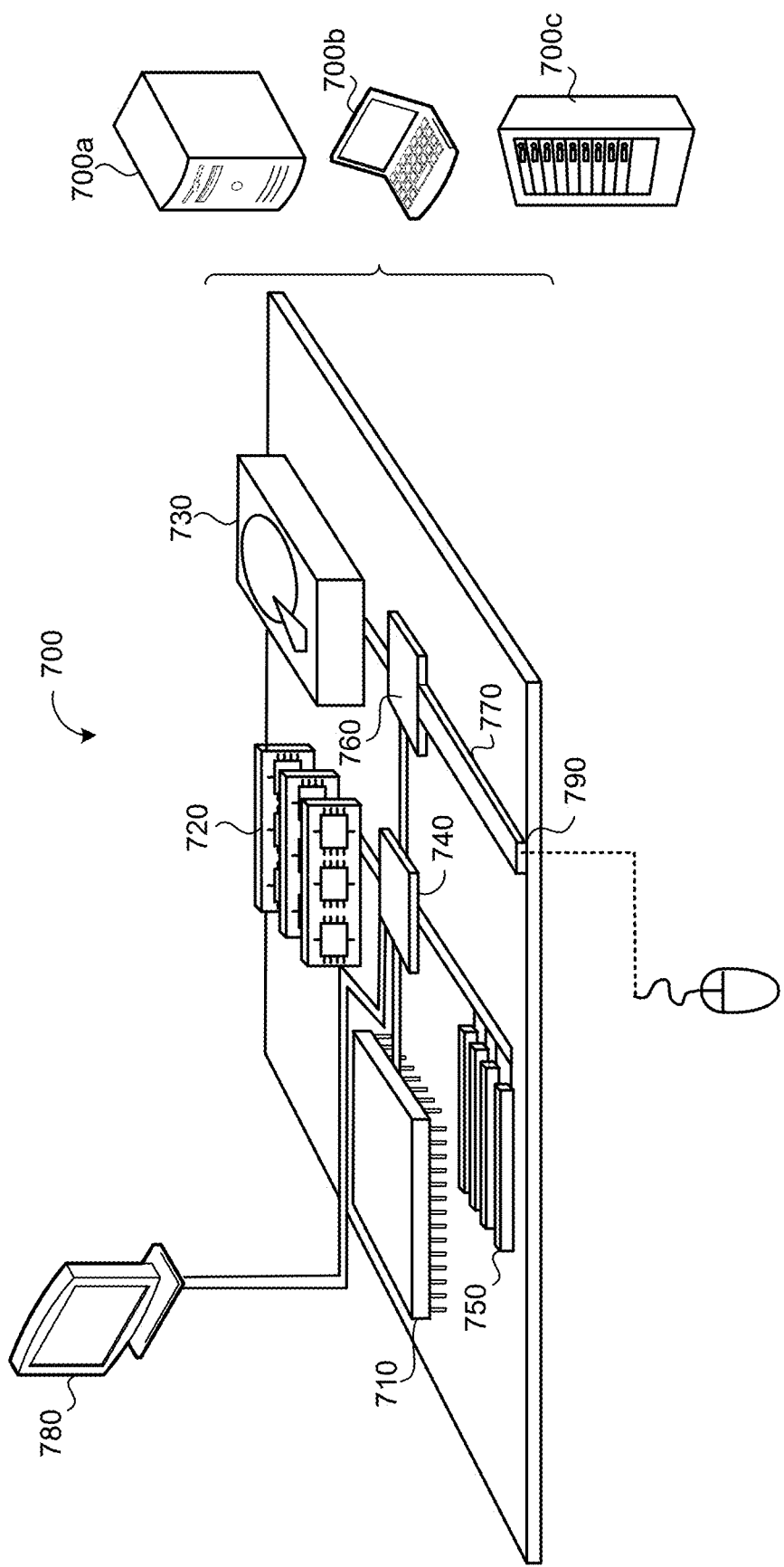
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   receiving video data comprising a series of frames of image data, the video data representative of an actor performing an activity;
   processing the video data to generate:
      a spatial input stream comprising a series of spatial images, each spatial image in the series of spatial images representative of spatial features of the actor performing the activity;
      a temporal input stream representative of motion of the actor performing the activity; and
      a pose input stream comprising a series of images, each image in the series of images representative of a pose of the actor performing the activity;
   processing, using a first neural network, the spatial input stream to generate a first output;
   processing, using a second neural network, the temporal input stream to generate a second output;
   processing, using a third neural network, the pose input stream to generate a third output;

summing the first output, the second output, and the third output to produce a summed output; and classifying the activity by selecting a highest probability activity that satisfies an activity threshold based on the summed output.

2. The method of claim 1, wherein each of the first neural network, the second neural network, and the third neural network are different from each other neural network.

3. The method of claim 1, wherein at least one of the first neural network, the second neural network, and the third neural network comprises a three dimensional convolutional neural network (3D CNN).

4. The method of claim 1, wherein the operations further comprise:

processing, using a softmax layer, the summed output.

5. The method of claim 4, wherein the first output, the second output, and the third output each comprise logits.

6. The method of claim 4, wherein classifying the activity by selecting the highest probability activity that satisfies the activity threshold is based on the processed summed output.

7. The method of claim 1, wherein the operations further comprise determining a second activity of a second actor in the video data.

8. The method of claim 1, wherein one of the first neural network, the second neural network, and the third neural network comprises a student neural network.

9. The method of claim 8, wherein each other neural network of the first neural network, the second neural network, and the third neural network that does not comprise the student neural network comprises a teacher neural network.

10. The method of claim 9, wherein the student neural network is trained by the teacher neural networks using a distillation process.

11. A system comprising:

data processing hardware; and memory hardware in communication with the data processing hardware, the memory hardware storing instructions that when executed by the data processing hardware cause the data processing hardware to perform operations comprising:

receiving video data comprising a series of frames of image data, the video data representative of an actor performing an activity;

processing the video data to generate:

a spatial input stream comprising a series of spatial images, each spatial image in the series of spatial images representative of spatial features of the actor performing the activity;

a temporal input stream representative of motion of the actor performing the activity; and a pose input stream comprising a series of images, each image in the series of images representative of a pose of the actor performing the activity;

processing, using a first neural network, the spatial input stream to generate a first output;

processing, using a second neural network, the temporal input stream to generate a second output;

processing, using a third neural network, the pose input stream to generate a third output;

summing the first output, the second output, and the third output to produce a summed output; and classifying the activity by selecting a highest probability activity that satisfies an activity threshold based on the summed output.

12. The system of claim 11, wherein each of the first neural network, the second neural network, and the third neural network are different from each other neural network.

13. The system of claim 11, wherein at least one of the first neural network, the second neural network, and the third neural network comprises a three dimensional convolutional neural network (3D CNN).

14. The system of claim 11, wherein the operations further comprise:

processing, using a softmax layer, the summed output.

15. The system of claim 14, wherein the first output, the second output, and the third output each comprise logits.

16. The system of claim 14, wherein classifying the activity by selecting the highest probability activity that satisfies the activity threshold is based on the processed summed output.

17. The system of claim 11, wherein the operations further comprise determining a second activity of a second actor in the video data.

18. The system of claim 11, wherein one of the first neural network, the second neural network, and the third neural network comprises a student neural network.

19. The system of claim 18, wherein each other neural network of the first neural network, the second neural network, and the third neural network that does not comprise the student neural network comprises a teacher neural network.

20. The system of claim 19, wherein the student neural network is trained by the teacher neural networks using a distillation process.

* * * * *